Patented Feb. 28, 1950

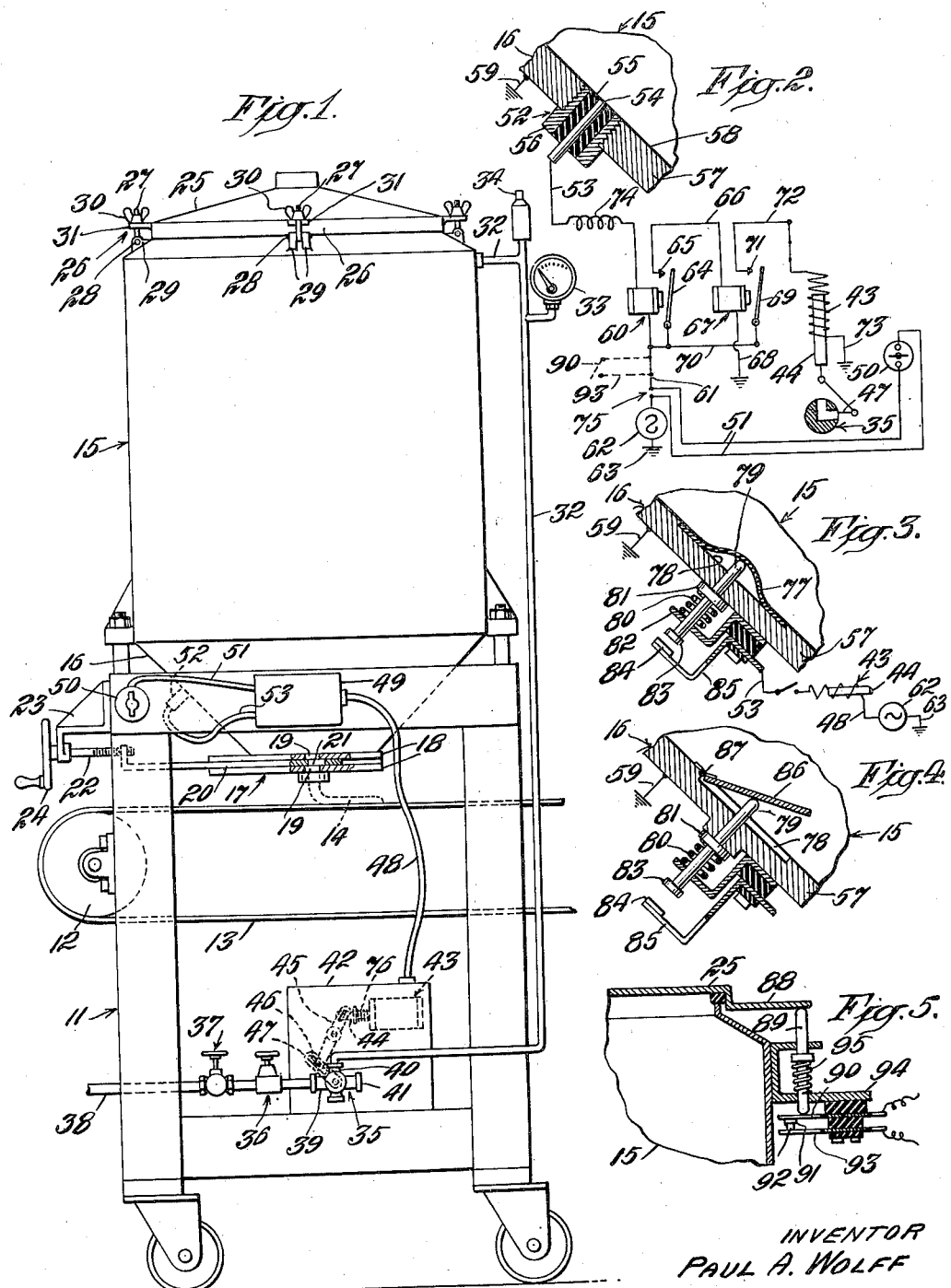

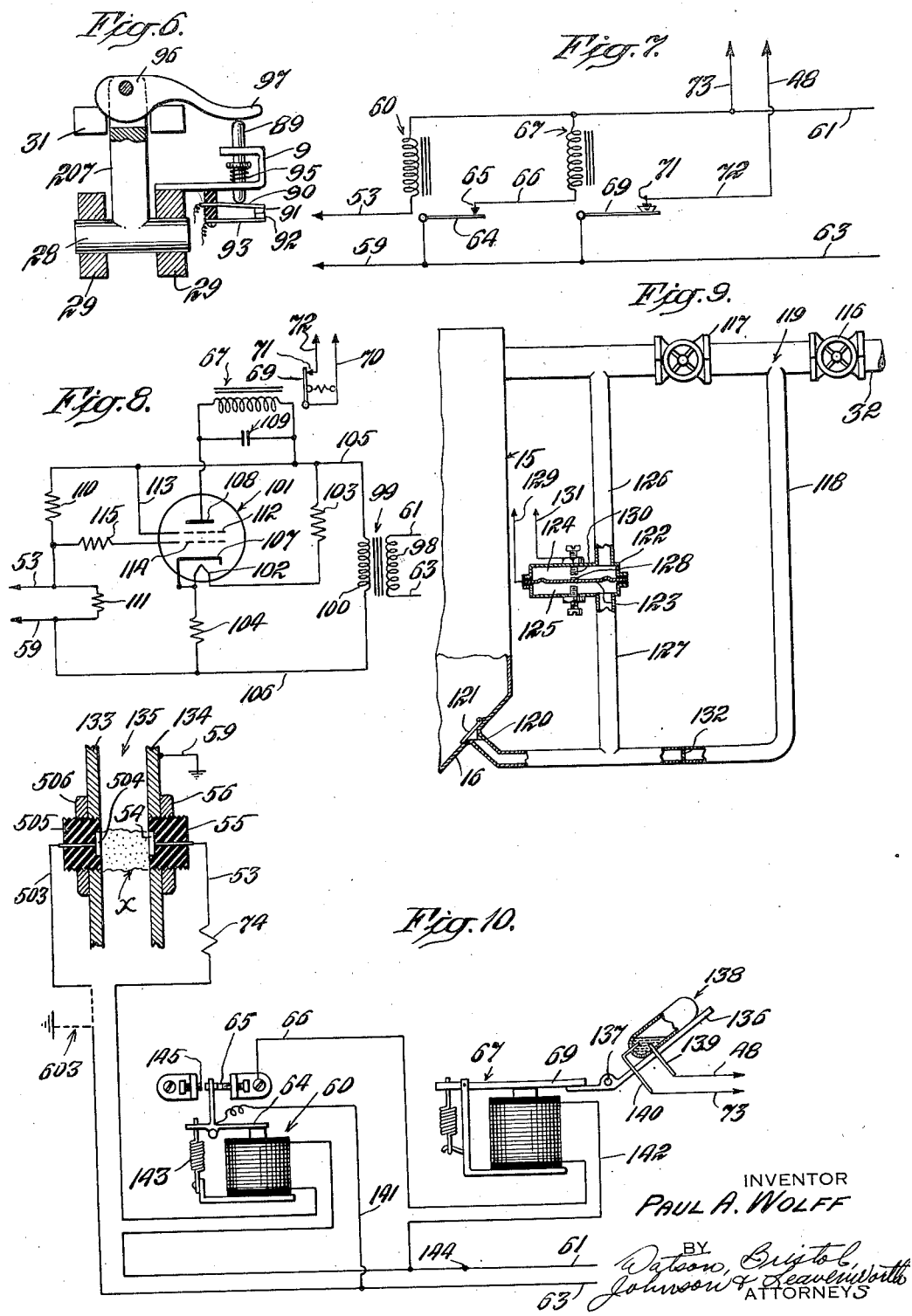

2,499,206

UNITED STATES PATENT OFFICE 2,499,206

PRESSURE EXTRUSION APPARATUS

Paul Anthony Wolff, Hoboken, N. J., assignor to General Baking Company, New York, N. Y., a corporation of New York Application October 5, 1945, Serial No. 620,525

13 Claims. (Cl. 222—66)

The present invention relates to pressure extrusion apparatus and, more particularly, to such apparatus adapted for automatic control of extrusion of mobile doughy material through an outlet of a supply tank by means of fluid pressure.

A general object of the present invention is to provide such apparatus or means in such apparatus which can be readily and economically manufactured, easily assembled and efficiently used effectively to apply gaseous fluid pressure to a charge of mobile doughy material in a supply tank to extrude the material from an outlet and automatically to shut off or terminate extrusion when the tank is emptied or the quantity of the charge of mobile doughy material therein is reduced to a predetermined minimum.

A more specific object of the invention is to provide in such apparatus electrical means effectively to terminate automatically extrusion of mobile doughy material as a charge of the latter is reduced in quantity to a predetermined minimum, preferably the mobile doughy material itself being employed as control means either through response of means to weight of the mobile doughy material, or electrical conductance of the latter, or otherwise; in which features of safety including the employment of low voltage may be readily incorporated.

Another object of the invention is to provide such apparatus which automatically avoids splattering of mobile doughy material from the extrusion outlet when the extrusion tank charge becomes quite depleted and which permits effective venting of gaseous driving fluid from the tank with termination of extrusion so that the tank may be readily opened for replenishment therein of mobile material; the apparatus being especially adapted to sanitary handling of material intended for human consumption.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 1 is an elevational view, with parts in section and broken away, of an embodiment of the pressure extrusion apparatus of the present invention;

Fig. 2 is a wiring diagram schematically showing therein various elements, including relays, of an electrical circuit that may be employed in the apparatus shown in Fig. 1, and showing in section certain portions of an embodiment of control means;

Fig. 3 is a diagrammatic view of a modified form of the means shown in Fig. 2, showing in section portions of another embodiment of control means;

Fig. 4 is a sectional view, with parts broken away, of a modified form of the control means shown in Figs. 2 and 3;

Fig. 5 is a detailed view in section, with parts broken away, of a portion of the supply tank and cover thereof shown in Fig. 1 equipped with certain electrical circuit breaking means to permit automatic operation of the electrical control apparatus of any of Figs. 1 to 4 inclusive only when the cover of the supply tank is in closed position;

Fig. 6 is an enlarged elevational view, with parts in section, of a latch member adapted to control a circuit breaking device similar to that shown in Fig. 5;

Fig. 7 is a schematic view of an electrical circuit similar to that shown in Fig. 1, which may be employed with the control means shown therein or in other figures of the drawings;

Fig. 8 is a schematic view of a modified form of the electrical circuit shown in Fig. 7 proposing employment of electronic means in lieu of sensititve relay means;

Fig. 9 is an elevational view, with parts in section and broken away, of a portion of the supply tank shown in Fig. 1 when equipped with certain automatic pneumatic operating and control means; and Fig. 10 is a wiring diagram of a further modified form of electrical means, including relays, which may be employed in accordance with the present invention for automatic control and operation of an extrusion tank such as that shown in Fig. 1, and with certain parts shown in elevation, broken away and in section.

It has been proposed to extrude or discharge various types of mobile material, such as food stuffs, etc., e. g., plastic or slow-flowing egg meats, doughs and the like, from supply tanks through discharge openings or die holes, by pressure applying means. It has also been proposed to provide the supply tank as a closed structure and to apply extruding pressure to a charge of mobile material therein by supplying to the tank behind the mobile material a fluid under pressure, such as a gaseous fluid, e. g., air, to force the mobile material through the opening. However, such proposals have usually been featured by manual controls to initiate and terminate the application of pressure to the mobile material and to vent the tank so that it may be opened for replenishment of the charge of mobile material therein. Incautious workmen are prone carelessly to fail to terminate application of pressure to the mobile material while a small amount of the charge thereof remains in the tank, and thus permit blowing and splattering of mobile material from the discharge outlet or opening. As a result, annoying cleaning operations are made necessary. These and other difficulties attendant upon manual control, and dependence upon the efficiency of workmen, are effectively eliminated by the present invention wherein extrusion is automatically initiated and terminated in response to the quantity of the charge of mobile material in the supply tank, as will be more fully hereinafter indicated in connection with a description of the drawings, wherein like numerals identify like parts throughout.

As shown in Fig. 1, an extrusion tank apparatus for doughlike material, such as a dough for a bakery product, may, in accordance with one embodiment of the invention, comprise a supporting frame 11 on which is mounted a pulley 12 having a delivery belt 13 entrained thereabout to carry away an extruded or died elongated element, such as a sheet of dough, as suggested in dotted lines at 14. The frame 11 supports a supply tank 15 having a bottom portion 16 preferably sloped as shown, and terminating at its point of lowest elevation in a gate mechanism 17.

The gate mechanism 17 may comprise a pair of fixed plates 18, 18, each having a discharge aperture 19 therein. Between the pair of fixed plates 18, 18 may be slidably mounted an adjustment gate plate 20 having a discharge hole 21 to be adjusted laterally by movement of the gate plate 20 with respect to the fixed discharge openings 19, 19, so as to vary at will the dimensions of, or in the ultimate shut off, the extrusion opening. By way of example, the laterally movable gate plate 20 is shown associated with a worm 22 supported by a bracket 23 on the side of the frame 11, and equipped with a hand wheel 24 for lateral adjustment of the gate plate.

The supply tank 15 is equipped with a removable cover 25 which may be clamped in an airtight manner to the top of the tank by any suitable means, such as a plurality of clamps 26—26, each of which may comprise a threaded bolt 27 pivotally mounted at 28 between a pair of ears 29, 29 fixed on the top of the supply tank. A wing nut 30 threaded onto the bolt 27 is adapted to bear down upon a forked ear 31 when the bolt 27 is received in the slot therein and the wing nut 30 is screwed down into clamping position.

A gaseous fluid or air supply conduit 32 is let in through the side wall of the tank 15 near the top thereof and may have connected thereto a pressure gauge 33 and a safety valve 34. The air supply conduit 32 is connected to a two-way valve 35 supported in any suitable manner upon the frame 11 and the two-way valve is in turn connected through a reducing valve 36 and hand gate valve 37 to a conduit 38 leading from any suitable source of fluid pressure, such as a tank for air under pressure suitably associated with a compressor. The two-way valve 35 will thus have an inlet 39, an outlet 40 connected into the air supply conduit 32 for the extrusion tank, and a venting outlet 41.

A structure 42 mounted upon the frame 11 may support the two-way valve 35 and means to operate the latter, such as an electromagnet or solenoid 43 shown in dotted lines in Fig. 1, having its plunger or slidable core 44 linked to a pivoted arm 45 which in turn carries a pin 46 slidably received by a slotted arm 47 fixed to the valve for rotation of the latter. The control means for the two-way valve 35 may include, in addition to the solenoid 43, electrical conductor means 48 connecting the latter to electrical apparatus housed in a casing or box 49 mounted on the frame 11, a manual control switch 50 connected by a two-wire electrical conductor means 51 to the apparatus in the casing 49 and an automatic control or electrical make-and-break device 52 mounted on the bottom portion 16 of the tank 15 and connected to the electrical apparatus in the casing 49 by conductor means 53.

From the wiring diagram shown in Fig. 2 it will be seen that the automatic control device 52 may comprise an electrode or contact element 54 sealed within a sleeve 55 of insulating material preferably machinable, such as neoprene, Mycalex, Spauldite, etc., which in turn is sealed within an externally threaded collar 56 threadably received within an internally threaded hole in the wall 57 of the bottom portion 16 of the extrusion supply tank 15, as shown in Fig. 2. The inner ends of the contact element 54 and insulating sleeve 55 preferably are flush with the inner surface 58 of the tank wall 57 to avoid crevices or projections, which might tend to catch particles of dough making cleaning of the interior of the tank difficult and also making possible deterioration of such retained particles that might contaminate successive charges of mobile material or dough supplied to the tank.

Since it is usual to ground one side of an electrical power circuit, the supply tank 15 is shown in Fig. 2 as being grounded at 59, so that the tank itself may serve as one terminal element of electrical circuit means and the contact element 54 serve as a cooperating terminal element. The circuit will be closed when the terminal elements comprising the contact member 54 and the adjacent portion of the tank 15 are bridged by electrically conductive means. This bridging may be accomplished by the mobile material in the tank when it is electrically conductive.

As a factor of safety it is desired to have that portion of the electrical circuit means at the tank carry a relatively small current, merely sufficiently large to serve as a pilot in initiating operation of power circuit apparatus, such as through suitable relay mechanism. Accordingly, as is proposed in Fig. 2, the contact member 54 may be connected by its conductor 53 to one end of the winding of a sensitive relay 60, with the other end of that winding connected to one side of a suitable source 62 of alternating current or power supply by a conductor 61. This connection is made through safety switch 50 which is connected by conductors 51 into conductor 61 at 75. As previously suggested, the other side of the power supply may be grounded, such as is proposed in Fig. 2 at 63. The sensitive relay 60 includes a circuit closing armature 64 connected to the conductor 61 and adapted, when drawn toward the core of the relay, to close a power relay circuit at a contact 65. The contact 65 is connected by a conductor 66 to one end of the winding of a power relay 67, with the other end of the latter being grounded such as at 68. The power relay 67 may include an armature 69 connected by a conductor 70 to the power supply conductor 61 and adapted to cooperate with a contact 71 to close a circuit through the winding of the solenoid 43. For this purpose the contact 71 is connected by a conductor 72 to the conductor 48 connected to one end of the winding of the solenoid 43 with the other end of the winding of the latter grounded, such as at 73.

It has been found that bakery dough is electrically conductive but may have a resistance of the order of five thousand (5000) ohms between the tank wall 58 and relatively small contact surface of member 54. Since a rugged relay capable of switching the power for the shut-off device directly, such as the solenoid 43 for operating the two-way valve 35, cannot be operated by the relatively small current which would flow through the dough at normal voltages a sensitive relay must be employed in that portion of the electrical circuit which is to be closed by bridgement of the electrical terminal means in the extrusion supply tank. This fact, together with the desired safety feature mentioned above, dictates the employment of the sensitive relay 60 which is used to close contacts that switch line current for the heavy duty relay 67 which may be of the mercury type or other type of heavy duty or power switching relay.

A sensitive relay should be selected so that the vector sum of the impedances, comprising the impedance of the sensitive relay plus the contact resistance at the electrical terminal elements (consisting of the contact member 54 and adjacent portion of the supply tank), divided into the line voltage will give a current value as large as possible compared to the current necessary to operate the relay. If the current thus available is many times larger than the current required, a resistor such as that indicated at 74 may be put in series with the sensitive relay 60, such as by connection into the conductor 53. This will not only give the relay the right amount of current, but will also make the circuit less susceptible to variation in dough formula. By way of example, the sensitive relay current through the dough may be in the order of one to ten milliamperes (1–10 ma.) at a voltage of about fifty volts (50 v.). With such conditions one could not get a serious shock or draw sparks from the terminal elements in the tank, e. g. contact member 54 and adjacent portion of the supply tank, thereby assuring safety to workmen cleaning the tank.

In operation of the apparatus proposed in Figs. 1 and 2, the cover 25 will be removed from the tank 15 and a quantity or charge of the mobile material, such as bakery dough, placed therein. The cover will then be properly clamped in position by means of the clamping devices 26—26 and the manual switch 50 then manipulated to connect power source 62 to the relays via conductors 51 and conductor 61. The current that will be switched by means of the power relay 67 will be supplied to the solenoid 43 thereby to energize the solenoid, causing it to rotate the two-way valve from a venting position, where the passage through the valve connects the air supply conduit 32 to atmosphere at outlet 41 for venting the tank, to a position connecting the conduits 38 and 32 together. With the placement of a quantity of dough in the tank sufficient to cover contact member 54 and bridge across to the adjacent portion 57 of the tank 15, a small current will be permitted to flow through the sensitive relay 60, causing it to close by means of its armature 64 the circuit through the power relay 67 which, in turn, will cause its armature 69 to close the circuit through the solenoid 43.

The solenoid 43, when thus energized, will manipulate the two-way valve 35 to permit flow of air under pressure through the conduit 32, as indicated above, and to the top of the closed tank 15 behind or above the charge of dough therein. This air pressure will then cause the dough to be extruded, for example, in the form of a ribbon 14 through the outlet opening (apertures 19, 19 and 21) in the bottom of the tank 15, until the quantity of the dough in the tank is reduced sufficiently to uncover the contact member 54. At this time the circuit of the sensitive relay 60 will be broken, which, in turn, will permit the power relay 67 to be deenergized to break the circuit through the solenoid 43. Thereupon the two-way valve 35 will be rotated by any suitable means, such as a biasing spring 76 indicated in dotted lines in Fig. 1, back to the venting position. As a matter of safety, the manual control switch 50 may then be opened, the cover 25 of the extrusion supply tank 15 opened, the dough in the tank replenished and the operation outlined above repeated.

It will be noted that the control device comprising the contact member 54 is located at an elevation appreciably higher than the elevation of the outlet provided by the cooperating apertures 19, 19 and 21. This assures that the application of air under pressure to behind or above the charge of dough in the supply tank 15 will be terminated at a time when there is still a small quantity of dough in the bottom of the tank. This avoids the possibility of the amount of dough in the tank being depleted to such an extent as to uncover the outlet and permit air under pressure to rush therethrough carrying with it particles or pieces of dough, resulting in splattering, and possibly necessitating cleaning of receiving or delivery means, such as the belt 13. It is obvious that the solenoid 43, or other operating control, may be employed to manipulate other shut-off devices, such as the sliding gate plate 20 instead of the valve 35 in the air supply line, to terminate extrusion. For this purpose the sliding gate plate 20 could be disengaged from the manually operated worm 22 and linked to the plunger of the solenoid so that when the latter was energized the gate plate would be moved to a position similar to that indicated in Fig. 21, and when the solenoid was deenergized suitable means, such as a biasing spring, could cause the gate plate to slide laterally to close off the extrusion opening.

A modified form of control device is proposed in Fig. 3 and, as therein shown, may comprise a flexible diaphragm 77 sealed into a recess 78 in the inner surface of the wall 57 of the bottom of the tank. Through the tank wall beneath the diaphragm 77 may be reciprocably mounted a plunger 79 biased by a spring 80 to the position shown, with the diaphragm 77 stretched into dome shape as indicated. The spring 80 is positioned between a collar 81 on the plunger 79 and a bracket 82 fixed to the exterior of the tank. The plunger 79 carries a contact member 83 to cooperate with another contact member 84 mounted upon an arm 85 connected in any suitable manner, such as through relays of other electrical apparatus, to the winding of the solenoid 43, but, for purposes of simplicity, such intervening apparatus has been omitted from Fig. 3. Weight of mobile material or dough on diaphragm 77 causes closure of the control portion of the electrical circuit means at the contacts 83 and 84.

A further modified form of control device is proposed in Fig. 4, wherein it is proposed to substitute for the flexible diaphragm 77 a flap 86 hinged to the tank wall 81 and 87 and adapted, when weighted by dough or other mobile material, to be pressed down into the recess 78 and push the plunger 79 outwardly to bring the contacts 83 and 84 together.

In Fig. 5 is proposed a safety switch which may be associated with the cover so that electrical circuit means will be broken when the cover is open and air under pressure will be permitted to be supplied to the tank only when the cover is closed. For this purpose the cover 25 may be equipped with an arm or projection 88 adapted, when the cover is clamped in position, to push a plunger 89 downwardly to force a contact arm 90 into position with a contact 91 thereon brought to engagement with another contact 92 on an arm 93 to close a circuit connected to the contact arms 90 and 93. The plunger 89 is suitably supported for reciprocative movement by a bracket 94 mounted on the top of the tank and biased to an upward position by a spring 95. If, for example, the contact arms 90 and 93 be connected into the power supply conductor 61, such as proposed in dotted lines in Fig. 2, it will be seen that only when the cover is in position, closing the supply tank 15, will it be possible to energize the solenoid and as a result supply air pressure to the closed supply tank.

In connection with the employment of such means to make certain that the means for initiating and terminating extrusion from the supply tank will be operative only when the cover of the tank is in closed position, it may be desired to associate switching means, such as that proposed in Fig. 5, with a clamping device which will permit energization of the solenoid 43 operating the shut-off device only after the cover has been securely clamped in position. This is particularly true when the shut-off device is employed to control flow of the air under pressure fed to the supply tank since, should air under pressure be fed to the supply tank before the cover is securely locked in sealed position, there may be undesirable leakage or flow at the juncture between the cover and tank top. Means to overcome such undesirable action are proposed in Fig. 6, wherein the clamping means may in lieu of the bolt 27, comprise a pivoted bar 207 carrying a cam latch 96 pivoted thereto and adapted to be engaged above the forked projection 31 on the cover and then rotated to the clamping position shown. The cam latch 96 preferably includes a handle 97 which, as it is moved downwardly to locked position, depresses plunger 89 to close the contacts 91 and 92.

In Fig. 7 is shown a wiring diagram of electrical apparatus similar to that proposed in Fig. 2. One side of the power supply circuit may or may not be grounded, as desired. As proposed in Fig. 7, the power relay may be of the heavy duty mercury type, and one end of the winding of the sensitive relay 60 may be connected by conductor 53 to any suitable control device, such as contact member 54 of the structure shown in Fig. 2 or the contact 84 of either of the structures proposed in Figs. 3 and 4. The conductor 59 connected to one side 63 of the supply circuit may in turn be connected to another contact member exposed in the tank and insulated from the latter and contact member 54, to the supply tank 15. In the latter case the portion of the tank adjacent contact member 54 and the latter serve as the pair of electric terminal means for making and breaking the electrical control circuit portion. Conductor 59 may also be connected to the contact 83 directly or through the tank 15 for cooperation with the contact 84 in the structures proposed in Figs. 3 and 4. Thus the conductors 53 and 59 will lead to a suitable control device responsive to the quantity of mobile material in the extrusion supply tank. The conductors 48 and 73 will lead to the shut-off device, such as electrical means for manipulating the two-way valve 35 or the sliding gate member 20.

Apparatus embodying electrical equipment the circuit wiring diagrams of which may be similar to those proposed in either of Figs. 2 or 7 may be modified to incorporate sensitive electronic equipment such as proposed in Fig. 8. Such electronic apparatus may be desired in view of the fact that it eliminates sensitivity that may be characteristic of certain relay apparatus, is very reliable and will produce direct current for energizing the power relay. As is well known, relays operate more reliably on direct current than on alternating current. As proposed in Fig. 8, the alternating current power circuit comprising conductors 61 and 63 may be connected to the primary winding 98 of a small isolating step-down transformer 99 having its secondary winding 100 supplying current to an electronic device such as an electronic tube 101. The electronic tube 101 has a filament 102 connected across the secondary winding 100 through suitable resistances 103 and 104 in a known manner by means of conductors 105 and 106 for the purpose of indirectly heating a cathode 107 in the electronic tube. Resistance 104 provides suitable cathode bias for the tube when in use. The electronic tube 101 includes a plate 108 connected through the winding of the power relay 67 to the conductor 105. A condenser 109 is connected across the winding of the relay 67 to insure a reasonably steady flow of current through the relay, despite the fact that the current supplied to the tube plate 108 is pulsating D. C. (half wave rectified A. C.).

The conductor 106 is connected to the conductor 59 which leads to one terminal element of the control device, and the conductor 105 is connected through a suitable resistance 110 to the conductor 53 leading to the other terminal element of the control device. Terminal elements of the control device are shunted by a suitable resistance 111 having a rating, for example, of about one hundred thousand (100,000) ohms. The conductor 105 is connected to a screen grid 112 in the electronic tube 101 by a conductor 113. A control grid 114 in the electronic tube 101 is connected through a resistance 115 to the conductor 105 between the resistance 110 and the conductor 53 leading to the control device. The resistances 110 and 115 may be of the order of five hundred thousand (500,000) ohms.

It will be seen that with an electronic apparatus characterized by an electrical circuit such as that shown in Fig. 8, power will be fed through the isolating transformer 99 to the circuit of the electronic device which replaces the first sensitive relay of the apparatus of Fig. 2. This electronic device will feed direct current to the winding of the power relay 67, and the control device connected across the conductors 53 and 59 will vary the operation or output of the circuit of the electronic device so that, for example, if the circuit be closed across the conductors 53 and 59, such as by bridgement of contacts in the extrusion supply tank by conductive mobile material, current flowing through conductors 53 and 59, though it be small, of the order of two-tenths of a milliampere (0.2 ma.), will bring about energization of the power relay 67. As a result the power relay when energized will cause its armature 69 to open a circuit at contact 71 to stop flow of current which may be supplied through conductor 70, such as by connection to one side of the A. C. supply, e. g., 61. The control, such as the winding of a solenoid for operating a valve, may be connected in series between the power supply and conductor 72 connected to contact 71. The functioning of such apparatus will be just the reverse of that described in connection with Figs. 1 and 2, except that the end results will be the same.

In an understanding of the operation of the apparatus of Fig. 8 consider only the half of the A. C. cycle when conductor 105 is positive with respect to conductor 106, since the tube 101 functions only when the plate 108 is positive with respect to the cathode 107. When there is no dough across the contacts, such as at 54 and 58, the control grid 114 is sufficiently positive with respect to the cathode 107 to cause plate current to flow and keep the power relay 67 energized and the circuit open at contact 71. When dough bridges across the contacts 54 and 58, the control grid 114 becomes less positive with respect to the cathode 107 and less plate current will flow and the power relay 67 will be deenergized thus permitting armature 69 thereof to close the control circuit at contact 71. As a result the operating device, such as solenoid 43, may open a valve, such as 35, in a fluid pressure line to build up pressure in the tank and cause extrusion of dough therefrom, as explained above. The purpose of resistor 115 is to prevent the control grid 114 from ever going too far positive, drawing substantial grid current, and overloading the tube 101.

Even though the current through the mobile material, such as dough, is as small as indicated, such electronic device of Fig. 8 will operate efficiently since such operation may be attained even though the current through the grid circuit of the electronic tube is made as small as one-twentieth (1/20) of that which will flow through the dough. Thus the electronic embodiment of the apparatus as proposed in Fig. 8 can be effectively employed with mobile material the electrical resistance of which is very high.

There has been described above electrical relay and electronic devices which may be employed in the practice of the present invention. It is also possible to practice the invention with a pneumatic device such as that proposed in Fig. 9, the parts of which are shown. In accordance with this embodiment of the invention the gaseous fluid or air pressure supply conduit 32 may be connected first through a control valve (not shown but which can be similar to control valve 35 shown in Fig. 1) and then through a pair of pressure regulators 116 and 117 to the extrusion supply tank 15. A conduit 118 is connected to the supply conduit 32 at 119 between the pressure regulators 116 and 117 and leads to an opening 120 in the side wall of the bottom portion 16 of the supply tank 15. The opening 120 is controlled by a flap valve 121 which is adapted, when weighted by a charge of mobile material or dough in the extrusion supply tank to close the opening 120 and thus prevent passage of gaseous fluid or air from the conduit 118 into the bottom portion of the tank. A casing 122 houses a flexible diaphragm 123 which is insulated from and divides the casing into two compartments or chambers 124 and 125. The chamber 124 is connected by a conduit 126 to the supply conduit 32 between the regulator 117 and the tank 15, and the chamber 125 is connected by a conduit 127 to the conduit 119. The flexible diaphragm 123 carries a contact member 128 and the diaphragm is connected to a conductor 129. Another contact member 130 is mounted in chamber 125 through a wall of casing 122 and is connected to another conductor 131. The conductors 129 and 131 may lead to the electrical circuit of a shut-off device which may comprise a solenoid for operating the control valve in supply conduit 32. To initiate flow of gaseous fluid through conduit 32 after a charge of mobile material is placed in tank 15 and the latter is closed, the switch comprising contacts 128 and 130 may be shunted by closure of a manual switch which will cause the solenoid of the control valve to be energized and the latter opened to supply gaseous fluid under pressure through conduit 32. As a result the contacts 128 and 130 will be closed in the manner hereinafter indicated and the manual shunting switch may then be opened to permit automatic shut-off when the quantity of mobile material becomes so depleted as to uncover flap valve 121.

By suitable setting of the regulators 116 and 117 of the pneumatic device of Fig. 9, the intermediate pressure of the gaseous fluid after it has flowed through the first regulator 116 will be lower than the supply pressure in that portion of conduit 32 preceding the regulators and about three pounds per square inch (3 lbs. per sq. in.) higher than the pressure in tank 15. This intermediate pressure is applied through the conduit 118 to the flap valve 121 at the opening 120. When there is mobile material or dough on the flap 121, gaseous fluid or air will be prevented from flowing at any substantial rate from the control line or conduit 118 at 120 into the supply tank 15. Consequently this pressure differential is applied on opposite sides of diaphragm 123, the higher pressure being supplied to chamber 125 to cause the diaphragm to be distorted upwardly. As a result contact 128 is carried upwardly into engagement with contact 130 thus effecting closure of the solenoid circuit even when the manual shunting switch is opened. The solenoid will thus remain energized and the supply valve operated thereby will be held open so long as this pressure differential is maintained.

However, when the quantity of mobile material or dough in the supply tank 15 is reduced sufficiently to uncover the flap 121, gaseous fluid or air will flow from the conduit 118 at 120 into the supply tank. As a consequence the pressure in the control line will drop from about three pounds per square inch (3 lbs. per sq. in.) above the pressure in the supply tank 15 to a pressure, say, about one-half pound per square inch (½ lb. per sq. in.) above the pressure in the supply tank. (This latter pressure differential is caused by pipe friction in the control line 118 and, if desired, by additional means, such as an orifice plate 132.) The diaphragm 123 will be sensitive to this change in pressure in the chamber 125 which is connected to the control line 119 by the conduit 127, the pressure in the chamber 124 being maintained constant. Accordingly, when this pressure differential drops in that manner the diaphragm 123 will return downwardly to its normal position carrying the contact 128 away from the contact 130, and separating them thereby opening the electrical circuit of the shut-off device operating solenoid to permit it to be manipulated such as by a suitable biasing spring. As previously indicated, that shut-off device may be a gate controlling the outlet or which is to be held open by the solenoid when energized extrusion orifice of the extrusion supply tank, or it may be a valve in the air pressure supply line 32.

Although it has been proposed, such as in Fig. 2, to ground one side of the electrical circuit through the extrusion supply tank 15 and insulate a contact member in the wall of the tank for engagement by the mobile material in the tank, it is possible to employ two separate contact members connected into the control portion of the electrical circuit means. Such a structure may be desired for employment at the bottom of the extrusion supply tank, as in an elongated discharge or extrusion tube at the discharge opening. For example, as proposed in Fig. 10, the extrusion supply tank may be equipped at the bottom thereof with a wide, flat tube having between its opposed walls, such as those proposed at 133 and 134, an elongated extrusion passage 135 through which dough may be extruded in a wide, flat ribbon. Through the wall 134 may be mounted a sleeve 55 of insulating material carrying contact member 54, and the supply tank, and thus the discharge tube, may be grounded such as at 59. One side of the supply circuit 61 may be connected through the winding of the sensitive relay 60 and the resistor 74 to the contact member 54. The armature 64 of the sensitive relay 60 is adapted, when the winding of the sensitive relay is energized, to close at the contact 65 the circuit of the winding of the power relay 67, this will cause the armature 69 of the latter in moving downwardly to tilt upwardly a support 136 pivoted at 137 and carrying a mercury switch 138 having its terminals 139 and 140 respectively connected to circuit conductors 48 and 73 leading to a shut-off device.

In the device proposed in Fig. 10 the control circuit of the sensitive relay will be closed by a ribbon of mobile material or dough passing through the passage 135 to bridge across between contact member 54 and adjacent portion of the discharge tube wall 134, as is indicated by the showing at X of a portion of such ribbon. With the employment of a single contact member such as 54 it will be necessary with such a circuit to ground the other side of the power supply, such as conductor 63, at any suitable point such as that indicated in dotted lines at 603 to complete the circuit through ground to the grounded connection 59. However, with the employment of parts spaced closely together, such as the opposed walls 133 and 134 of a discharge or extrusion tube connected to a supply tank, it is possible to employ two contact members, one in each opposed wall. In the latter case another contact member 504 may be mounted in a sleeve of insulation 505 through the wall 133 of the discharge or extrusion tube, and in this event the ground connection 59 may be omitted and the contact member 504 connected by a conductor 503 to the side 63 of the power supply.

It will be noted in Fig. 10 that the armature 64 is connected by conductor 141 to the side 63 of the power supply, that the contact member 65 is connected by conductor 66 to one end of the winding of the power relay 67, and that the other end of the winding of the latter is connected by conductor 142 to the other side of the power supply. Upon energization of the winding of the sensitive relay 60 (the circuit of which is closed when in one case dough bridges between the contact member 54 and grounded extrusion supply tank or its extrusion orifice tube comprising wall 134 or in another case between contact members 54 and 504 as suggested in Fig. 10), the armature 64 is pulled down against the biasing force of a spring 143 to close the circuit of the power relay 67 at contact 65. The winding of the power relay 67 is thus supplied with current through the conductor 141, armature 64, contact 65 and conductors 66 and 142. Upon such energization of the power relay 67 its armature is pulled down to flip the mercury switch 138 to the position shown. The mercury switch 138 closes an electrical circuit of the operating means for the shut-off device, which may be a valve in a pressure air supply line adapted to feed air under pressure to behind or above a charge of mobile material in the extrusion supply tank or a gate at the discharge or extrusion opening at the tank, or other suitable shut-off means which will readily occur to those skilled in the art. In the case of employment of the pair of contacts 54 and 504 in the extrusion tube 135 operation may be initiated by a manual shunting switch, as above suggested in connection with the apparatus shown in Fig. 9, until extruded mobile material in tube 135 such as at X, can be relied upon to hold the control circuit closed.

Obviously with one side of the power supply circuit grounded as is usual the circuit of Fig. 10 may be employed with slight alterations to obtain similar results in a different manner. With the ground connections 59 and 603 omitted, conductor 63 connected to wire 503 and the hot side of the power supply, and conductor 61 grounded, say at 144, the circuit of the winding of sensitive relay 60 will be completed through conductive material between extrusion equipment contact members 504 and 54. Armature 64 of sensitive relay 60 will close at contact 65 the circuit of the winding of power relay 67 which in turn will cause mercury switch 138 to close and hold closed the circuit of the shut-off device. The shut-off device in such case will be adapted either to operate a gate at the extrusion opening to hold it open against means biasing it to a closed position, while mercury switch 138 is closed or a valve in a gaseous fluid or air supply line to hold it open against mechanical biasing while the mercury switch is closed. If desired further alteration may be simply effected to attain the desired ends in a different manner by connecting wire 66 to contact 145 instead of contact 65. In the latter case when the circuit of the winding of the sensitive relay 60 is open due to absence of conductive mobile material between contact members 504 and 54 the spring 143 will bias the armature 64 to engagement with contact 145 and the winding of power relay 67 will be energized. Consequent closure of mercury switch 138 may be utilized to close the circuit of a shut-off device so that a spring-biased gate for the extrusion opening or spring-biased valve in an air supply line will be held closed whenever there is insufficient conductive mobile material between contact members 504 and 54 to close the sensitive relay circuit thereat, but with circuit-closing sufficiency of such material between those contact members the power relay will be deenergized and the shut-off device will be spring biased to open position. Similar variations of other embodiments of the invention may be provided in a simple manner as will be obvious to one skilled in the art.

The apparatus of Fig. 10 is particularly advantageous when the two contacts 54 and 504 are employed in that a "guarded circuit" may be provided when 59 and 61 are grounded. With any sort of electrical contact arrangement there is possibility of a smear of dough bridging from contact to ground. Using two contacts and a guarded circuit as shown, current will not flow through the relay if the gap is not completely bridged even though smears were to cover both contacts and ground them to the tank.

It will thus be seen that the objects set forth above and those made apparent from the preceding drawings, among others, are efficiently attained by the present invention, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, which I claim as new and desire to secure by Letters Patent is:

1. In a pressure extrusion apparatus for mobile doughy material the combination comprising, a supply tank having an extrusion outlet, means to apply driving gaseous fluid pressure to a charge of mobile doughy material therein to extrude it through the outlet, means successively to initiate and terminate extrusion of the mobile doughy material from the outlet, and control means for said last named means responsive to the quantity of the charge in said tank having an element in said tank located on a wall thereof at a particular point for continuous physical contact with the mobile doughy material when the charge of the latter is greater than a predetermined minimum to maintain extruding conditions during such contact and to discontinue extruding conditions when the physical contact is substantially eliminated, whereby extrusion will be terminated upon reduction of the quantity of the charge to a predetermined minimum.

2. In a pressure extrusion apparatus for mobile doughy material the combination comprising, a supply tank having an extrusion outlet, means to apply driving gaseous fluid pressure to a charge of mobile doughy material therein to extrude it through the outlet, means successively to initiate and terminate application of the driving gaseous fluid pressure to the charge of mobile doughy material in said tank successively to start and maintain and to stop pressure extrusion from the latter, and control means for said last named means responsive to the quantity of the charge in said tank having an element in said tank located on a wall thereof at a particular point for continuous physical contact with the mobile doughy material when the charge of the latter is greater than a predetermined minimum to maintain extruding conditions during such contact and to discontinue extruding conditions when the physical contact is substantially eliminated, whereby extrusion will be terminated upon reduction of the quantity of the charge to a predetermined minimum.

3. In a pressure extrusion apparatus for mobile doughy material the combination comprising, a supply tank having an extrusion outlet, means to apply gaseous fluid pressure to a charge of mobile doughy material therein to extrude it through the outlet, means successively to initiate and terminate application of the driving gaseous fluid pressure to the charge of mobile doughy material in said tank, and means to control said last named means including a device in the bottom of said tank located at an elevation appreciably higher than the elevation of the outlet, said device being responsive to engagement by a quantity of mobile doughy material whereby application of the driving gaseous fluid pressure to a charge of mobile doughy material in said tank will be terminated when the quantity of the charge is reduced to a relatively small quantity by extrusion as to disengage the mobile material from said device.

4. In a pressure extrusion apparatus for mobile doughy material the combination comprising, a supply tank having an extrusion outlet, means to apply driving pressure of a relatively non-conductive gaseous fluid to a charge of electrically conductive mobile doughy material in said tank to extrude the mobile doughy material through the outlet, means successively to initiate and terminate extrusion of the mobile doughy material from the outlet, and electrical means to control said last named means including a device in the bottom of the tank, said device comprising separated electrical circuit terminal means adapted to be engaged by the electrically conductive mobile doughy material in said tank to retain closure of an electrical circuit of said electrical means through the mobile doughy material until the quantity of the latter is so reduced by extrusion as to disengage the mobile doughy material from said circuit terminal means.

5. In a pressure extrusion apparatus for mobile doughy material the combination comprising, a supply tank having an extrusion outlet, means to apply driving pressure of a relatively non-conductive gaseous fluid to a charge of electrically conductive mobile doughy material in said tank to extrude the mobile doughy material through the outlet, means successively to initiate and terminate extrusion of the mobile doughy material from the outlet and electrical means to control said last named means including a device in the bottom of said tank, said device comprising separated electrical circuit terminal means substantially flush with the inner surface of the bottom of said tank and adapted to be contacted and bridged by the electrically conductive mobile doughy material in said tank to retain closure of an electrical circuit of said electrical means through the mobile doughy material until the quantity of the latter is so reduced by extrusion as to disengage the mobile doughy material from contact with at least one of said circuit terminal means.

6. In a pressure extrusion apparatus for mobile doughy material the combination comprising, a supply tank of electrically conductive material and having an extrusion outlet, means to apply driving pressure of a relatively non-conductive gaseous fluid to a charge of electrically conductive mobile doughy material in said tank to extrude the mobile doughy material through the outlet, means successively to initiate and terminate entrusion of the mobile doughy material from the outlet, electrical means to operate said last named means, electrical circuit means adapted to supply electrical current to said electrical operating means including one side grounded to said tank, and a circuit contact means located in the bottom of said tank comprising a circuit terminal member connected to the other side of said circuit means and exposed on the interior of the tank and insulated from the latter, said tank and contact member thereby serving as a pair of circuit terminal contact means to be bridged for closure of said circuit means by the electrically conductive mobile doughy material when the quantity of a charge thereof is sufficient to cover said contact member and to act as circuit breaking means when the quantity of the charge of mobile doughy material is reduced by extrusion sufficiently to uncover said contact member.

7. In a pressure extrusion apparatus for mobile doughy material the combination comprising, a supply tank of electrically conductive material and having an extrusion outlet, means to apply driving pressure of a relatively non-conductive gaseous fluid to a charge of electrically conductive mobile doughy material in said tank to extrude the mobile doughy material through the outlet, means successively to initiate and terminate extrusion of the mobile doughy material from the outlet, electrical means to operate said last named means, electrical circuit means adapted to supply electrical current to said electrical operating means including one side grounded to said tank, and a circuit contact means located in the bottom of said tank at an elevation appreciably higher than the elevation of the outlet comprising a circuit terminal member connected to the other side of said circuit means and exposed on the interior of the tank and insulated from the latter, said tank and contact member thereby serving as a pair of circuit terminal contact means to be bridged for closure of said circuit means by the electrically conductive mobile doughy material when the quantity of a charge thereof is sufficient to cover said contact member and to act as circuit breaking means when the quantity of the charge of mobile doughy material is reduced by extrusion sufficiently to uncover said contact member.

8. In a pressure extrusion apparatus for mobile doughy material the combination comprising, a supply tank of electrically conductive material and having an extrusion outlet, means to apply driving pressure of a relatively non-conductive gaseous fluid to a charge of electrically conductive mobile doughy material in said tank to extrude the mobile doughy material through the outlet, means successively to initiate and terminate extrusion of the mobile doughy material from the outlet, electrical means to operate said last named means, electrical circuit means adapted to supply electrical current to said electrical operating means including one side grounded to said tank, and a circuit contact means located in the bottom of said tank at an elevation appreciably higher than the elevation of the outlet comprising a circuit terminal member connected to the other side of said circuit means and inserted through the wall of said tank with insulating means surrounding said member separating it from the adjacent portions of said tank and sealing it in said wall, said contact member having a portion thereof exposed on the interior of said tank, said tank and contact member thereby serving as a pair of circuit terminal contact means to be bridged for closure of said circuit means by the electrically conductive mobile doughy material when the quantity of a charge thereof is sufficient to cover said contact member and to act as circuit breaking means when the quantity of the charge of mobile doughy material is reduced by extrusion sufficiently to uncover said contact member.

9. In a pressure extrusion apparatus for mobile doughy material the combination comprising, a supply tank of electrically conductive material and having an extrusion outlet, means to apply driving pressure of a relatively non-conductive gaseous fluid to a charge of electrically conductive mobile doughy material in said tank to extrude the mobile doughy material through the outlet, means successively to initiate and terminate extrusion of the mobile doughy material from the outlet, electrical means to operate said last named means, electrical circuit means adapted to supply electrical current to said electrical operating means including one side grounded to said tank, a circuit contact means located in the bottom of said tank comprising a circuit terminal member connected to the other side of said circuit means, and a sleeve of insulating material inserted through the wall of said tank and sealed therein with its inner end substantially flush with the inner surface of the adjacent portions of said tank, said contact member being sealed within said sleeve and having its inner end substantially flush with the inner end of said sleeve, said tank and contact member thereby serving as a pair of circuit terminal contact means to be bridged for closure of said circuit means by the electrically conductive mobile doughy material when the quantity of a charge thereof is sufficient to cover said contact member and to act as circuit breaking means when the quantity of the charge of mobile doughy material is reduced by extrusion sufficiently to uncover said contact member.

10. In a pressure extrusion apparatus for mobile doughy material the combination comprising, a supply tank having an extrusion outlet, conduit means to supply driving gaseous fluid pressure to said tank behind a charge of mobile doughy material therein to extrude it through the outlet, valve means in said conduit means successively to permit and stop flow of the driving gaseous fluid therethrough to initiate and terminate application of fluid pressure to the charge of mobile doughy material in said tank, and means to control said valve means including a device in the bottom of said tank located at an elevation appreciably higher than the elevation of the outlet, said device being responsive to engagement by a quantity of mobile doughy material whereby application of the driving gaseous fluid pressure to a charge of mobile doughy material in said tank will be terminated when the quantity of the charge is so reduced by extrusion as to disengage the mobile doughy material from said device.

11. In a pressure extrusion apparatus for mobile doughy material the combination comprising, a supply tank having an extrusion outlet, conduit means to supply driving gaseous fluid pressure to said tank behind a charge of mobile doughy material therein to extrude it through the outlet, supply valve means in said conduit means successively to permit and stop flow of fluid therethrough to initiate and terminate application of fluid pressure to the charge of mobile doughy material in said tank, electrical means to operate said valve means, electrical circuit means adapted to supply electrical current to said electrical operating means including a circuit make-and-break device, pneumatic means responsive to a differential in gaseous fluid pressure to operate said make-and-break device, conduit connections leading from said pneumatic means to said tank at one first point in the vicinity of the extrusion outlet and at another second point remote from that first point and in the vicinity of the connection of the conduit means for supply of the driving gaseous fluid to said tank, and control valve means at the first point of conduit connection with said tank to be closed by the mobile doughy material when the quantity of charge thereof exceeds a predetermined minimum and to be opened when that quantity is less than that predetermined minimum so as to vary the differential in pressure to which said pneumatic means is subjected to assure that said supply valve is opened when the charge quantity so exceeds and closed when the charge quantity so becomes less than the predetermined minimum.

12. In a pressure extrusion apparatus for mobile doughy material the combination comprising, a supply tank having an extrusion outlet, in the bottom portion thereof, conduit means to supply relatively non-conductive gaseous fluid pressure to said tank above a charge of electrically conductive mobile doughy material therein to extrude it through the outlet, valve means in said conduit means successively to permit and stop flow of the gaseous fluid therethrough to initiate and terminate application of fluid pressure to the charge of mobile doughy material in said tank, electrical means to operate said valve means, electrical circuit means adapted to supply electrical current to said electrical operating means including one side grounded to said tank, a circuit contact means located in the bottom portion of said tank at an elevation appreciably higher than the elevation of the outlet comprising a circuit terminal member connected to the other side of said circuit means, and a sleeve of insulating material inserted through the wall of said tank and sealed therein with its inner end substantially flush with the inner surface of the adjacent portions of said tank, said contact member being sealed within said sleeve and having its inner end substantially flush with the inner end of said sleeve, said tank and contact member thereby serving as a pair of circuit terminal contact means to be bridged for closure of said circuit means by the electrically conductive mobile doughy material when the quantity of a charge thereof is sufficient to cover said contact member and adjacent portion of said tank and to act as circuit breaking means when the quantity of the charge of mobile doughy material is reduced by extrusion sufficiently to uncover said contact member.

13. In a pressure extrusion apparatus for mobile doughy material the combination comprising, a supply tank of electrically conductive material having an extrusion outlet in the bottom thereof at the point of lowest elevation, a cover for said tank to permit supply thereto of a charge of electrically conductive mobile doughy material and hermetic closing, conduit means connected to the top portion of said tank to supply relatively non-conductive gaseous fluid under pressure above a charge of the mobile doughy material therein to extrude the mobile doughy material through the outlet, valve means in said conduit means successively to permit and shut off flow of gaseous fluid through said conduit means to initiate and terminate extrusion of the mobile doughy material through the outlet, means automatically to vent said tank of gaseous fluid when said valve means is shut off, electromagnetic means to operate said valve means, electrical circuit means for supplying current to said electromagnetic means and including control means mounted on said tank, said control means including a circuit make-and-break device having means accessible through the wall of said tank located at an elevation appreciably higher than the elevation of the outlet and comprising a circuit terminal member exposed on the interior of the tank and insulated from the latter, a portion of said circuit means being connected to said tank whereby a portion of the latter adjacent said terminal member also serves as terminal means, said electromagnetic means being associated with said terminal means in said electrical circuit means whereby when a charge of the mobile doughy material in said tank is of sufficient quantity to contact said terminal member and bridge across to the tank terminal portion for circuit closure said valve means will be open to permit supply of gaseous fluid to said tank and when the quantity of the charge is so reduced by extrusion as to disengage the mobile doughy material from said terminal member a portion of the circuit means will be opened at said terminal means and said valve means will be closed.

PAUL ANTHONY WOLFF.

REFERENCES CITED

The following references are of record in the file of this patent:

UNITED STATES PATENTS

| Number | Name | Date |
|---|---|---|
| 496,843 | Arnott | May 9, 1893 |
| 1,831,898 | Wignall | Nov. 17, 1931 |
| 1,892,790 | Smelser | Jan. 3, 1933 |
| 1,966,681 | Petersen et al. | July 17, 1934 |
| 2,063,727 | Davis | Dec. 8, 1936 |
| 2,202,197 | Erwarts | May 28, 1940 |
| 2,381,505 | Lindholm | Aug. 7, 1945 |
| 2,399,327 | Cullen | Apr. 30, 1946 |

Certificate of Correction

Patent No. 2,499,206 February 28, 1950

PAUL ANTHONY WOLFF

It is hereby certified that errors appear in the printed specification of the above numbered patent requiring correction as follows:

Column 3, lines 39 and 40, for the word "adjustment" read *adjustable*; column 6, line 72, for "relays of" read *relays or*; column 7, line 8 should read *hinged to the tank wall 57 at 87 and adapted,*; line 35, before "pressure" insert *under*; column 14, line 11, before "gaseous" insert *driving*; column 15, line 5, for "entrusion" read *extrusion*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*